Aug. 7, 1962  P. DE VECCHI  3,047,937
METHOD OF MAKING LINED PIPE CONNECTIONS
Filed Oct. 25, 1956  2 Sheets-Sheet 1

INVENTOR
Paul De Vecchi

BY *Wendroth, Lind & Ponack*

ATTORNEYS

Aug. 7, 1962  P. DE VECCHI  3,047,937
METHOD OF MAKING LINED PIPE CONNECTIONS
Filed Oct. 25, 1956  2 Sheets-Sheet 2

INVENTOR
Paul De Vecchi

BY Wendroth, Lind & Ponack
ATTORNEYS

United States Patent Office 3,047,937
Patented Aug. 7, 1962

3,047,937
METHOD OF MAKING LINED PIPE
CONNECTIONS
Paul de Vecchi, Riehen, Switzerland, assignor to Ciba Limited, Basel, Switzerland, a Swiss firm
Filed Oct. 25, 1956, Ser. No. 618,338
Claims priority, application Switzerland Oct. 28, 1955
7 Claims. (Cl. 29—157)

Numerous methods are known for making connections with unprotected pipes made of a hard material, for example, iron, steel or other metal. However, difficulties arise in making connections in iron pipes provided with a protective lining of softer corrosion-preventing material, for example, an artificial resin or especially hard rubber which is especially desirable owing to its low price and good properties.

As compared with pipes made wholly of an artificial plastic pipes having a protective lining of such material, by virtue of their external covering of iron, have the advantage of being able to withstand subatmospheric and superatmospheric pressures and external injury, even at temperatures of about 100–130° C. at which the internal protective layer inevitably undergoes some degree of softening. Ordinary pipe connections cannot be used for connecting pipes of that kind owing to the need to afford protection against corrosion at the joint. Hitherto it has been necessary to cut the iron pipe to the desired length before applying the protective lining, fit the necessary flanges, and only after these operations to apply the protective lining. When the protective layer has been applied so as to include the connecting flanges the assembly can be set up in its final position. Obviously, however, this method of assembly is time-consuming and entails transport of the cut pieces to and fro. Accordingly, there is a need for a method of making pipe connections which can be carried out with the use of a supply of pipes already provided with a protective lining, at the place of assembly.

The present invention provides a method of making a pipe connection between a pipe, which is made of a hard material, more especially iron or steel, and has a protective lining of softer material, and a similar pipe or other element with the use of a clamping device such as is used for holding together the ends of pipes under a clamping pressure, wherein a portion of the hard material at the end of the lined pipe is removed by machining to form a conical surface and a portion of the softer protective lining is left at the end of the pipe the said portion of the softer protective lining is expanded and caused to cover the conical surface, a packing member having a surface mating with the covered conical surface and another surface mating with the surface of the element to which the pipe is to be connected is placed in position with the said surfaces in mating relationship and the assembled parts are clamped together to form a tight connection by means of the said clamping device.

The method of this invention may be applied to pipes in which the protective lining loosely adheres to the interior of the pipe or is inserted therein in the form of a flexible tubular structure of relatively softer material. The method of the invention is especially suitable for the widely used iron or steel pipes which are provided with a layer of vulcanized hard rubber as a protective lining. In view of the known fact that hard rubber, in addition to possessing many desirable properties, is rather brittle the difficulties referred to above apply also to pipes having such linings.

Devices are known which can be assembled easily on the spot and serve for clamping together the ends of pipes, and which have already been used for making screw connections between pipes of rustless steel and other materials requiring no protective lining. Thus, for example, a groove is formed in the external surface of the pipe a short distance from the end thereof, and a ring is inserted in the groove so as to serve as a stop enabling the screw clamping device or the flanges to clamp together the ends of the pipes (see, for example, Swiss Patent No. 289,465). Other well known methods, such as the formation of external screw threaded portions on the pipes, may be used. It is an advantage of the present invention that the connection can be made without the necessity of enlarging the outer diameter of the pipe.

In a preferred form of the method of the invention the ends of the pipes are machined away so that the softer protective lining is left substantially unchanged, and a conical hollowed-out portion possessing in longitudinal section the shape of a right-angled triangle is formed between the external surface of the pipe and the protective lining. By inserting a heated mandrel having a corresponding conical surface into the end of the tube prepared as described above the portion of the protective lining of hard rubber adjacent to the conical surface is widened and pressed against the conical surface of the end of the pipe. A packing member is then inserted, which is substantially of annular shape and has a packing surface which mates with the prepared end of the tube. The tight connection is then completed by means of a clamping device of the kind referred to above.

The packing member is preferably of double conical form with each of the conical surfaces preferably provided with an annular recess (the opposed annular recesses together forming a minimum axial dimension in the packing member between the external and internal surfaces thereof), which receives the end of the pipe. On one side of the recess, advantageously on the inner side thereof, lies the conical packing surface and on the other side of the recess there is a smaller conical surface or a simple beading. This construction has the advantage that at least in the case in which also the expanded end of the hard rubber tube is at the end of the pipe the packing member will produce a tight closure between the metal pipe and the protective lining.

In order to obtain the full advantage of the present invention it is of course necessary to make the packing member either wholly of non-corroding material or, if it is made of iron or is at least provided with an iron core to cover it with non-corroding material, for example, hard rubber. In order to produce a good packing it is generally of advantage, when iron pipes having a protective lining of hard rubber are used, to provide the packing member with a covering of softer material, for example, one having a Shore hardness of approximately 70–90. The packing member may, if desired, be made very small. Alternatively the length of the packing member in an axial direction may be so chosen as to compensate for accidental differences in length, and for this purpose the packing member may be made longer than necessary solely for performing its packing function.

The invention is illustrated by way of example in the accompanying drawings, in which FIG. 1 shows in longitudinal section an iron pipe having a hard rubber lining after the conical surface has been formed at the end of the pipe.

In all the figures the broken line 11 denotes the axis of the pipe or of the packing member, whose axis coincides with that of the pipe. In FIGS. 1–6 21 indicates the iron pipe and 22 the protective lining. In FIGS. 1–4 the protective lining is of hard rubber, and in FIGS. 5 and 6 it is of a softer material, for example, soft rubber, polyvinyl chloride or polyethylene of appropriate flexibility.

Figure 1:
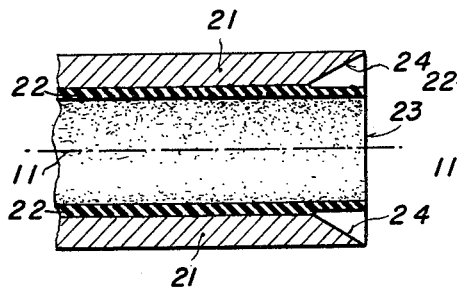

In FIG. 1 the pipe 21, 22 has been cut to the desired length and a conical surface 24 has been machined away at the end 23 of the pipe while substantially retaining the protective lining 22.

Figure 2:
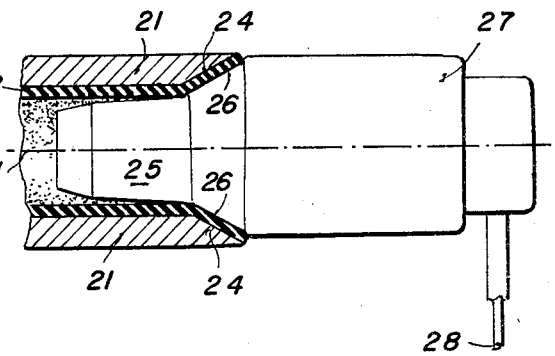
FIG. 2 shows in longitudinal section the iron pipe shown in FIG. 1 with its hard rubber lining expanded at the end of the tube and also shows, not in section, the heated conical mandrel.

In FIG. 2 is shown a heated mandrel 25 which is provided with an external conical surface 26 corresponding to the conical surface 24, and which surface 26 is preferably also heated. The mandrel is fixed to a hand grip 27 and is provided with a lead 28 for supplying electric current to provide the energy required for heating. When the heated mandrel 25 is inserted in the interior of the protective lining 22 the latter is first softened, and then, when the mandrel is pushed more strongly into the position shown in the drawing, the lining is pressed against the conical surface 24.

Figure 3:
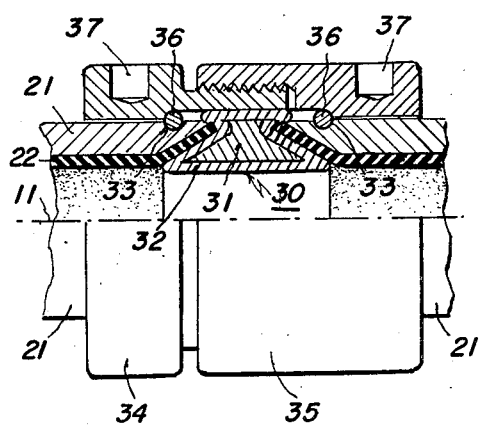
FIG. 3 shows in its upper half a longitudinal section of a connection between two pipes prepared as shown in FIGS. 1 and 2 and connected by means of screw threaded clamping means.

In FIG. 3 are shown the ends of two pipes prepared in the manner illustrated in FIG. 2, and connected tightly together with the interposition of a packing member 30 having a reinforcement 31 and protective covering 32. For this purpose two grooves 33 are formed one in each of the pipes 21. Two interengageable screw-threaded members 34 and 35 are passed over the ends of the pipes, and rings 36 are inserted in the grooves 33. The packing member 30 is inserted between the ends of the pipes, and the two members 34 and 35 are interengaged and screwed together, the bores 37 in the said members serving to receive a suitable tool.

Figure 4:
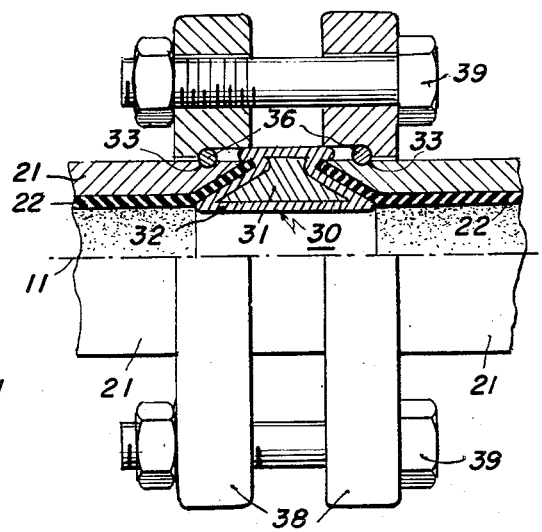
FIG. 4 shows, in the upper half thereof, a longitudinal section of an analogous pipe connection, but produced with the use of flanges instead of screw-threaded members.

In FIG. 4 all the parts are the same as shown in FIG. 3, except for the clamping device which in this case consists of two flanges 38 coupled together by screw-threaded bolts 39. In FIGS. 3 and 4 the rings 36, owing to the screw-threaded members 34 and 35 or the flanges 38 being shaped in the manner shown, are forced into the grooves 33 and thus form efficient stops.

Figure 5:
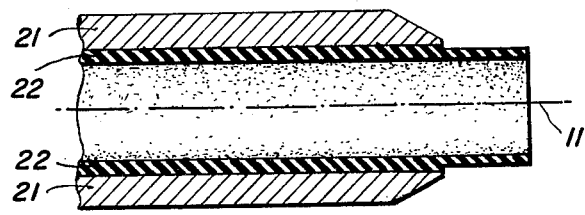
FIG. 5 shows in longitudinal section an iron pipe having an internal lining of soft material, after a conical surface has been formed at the end of the pipe in the reverse sense to that shown in FIG. 1.

In FIG. 5 is shown an iron pipe having its end machined away to form a conical surface in the reverse sense to that shown in FIG. 1, that is to say, such that a line normal to the conical surface extends outwardly from the axis of the pipe.

Figure 6:
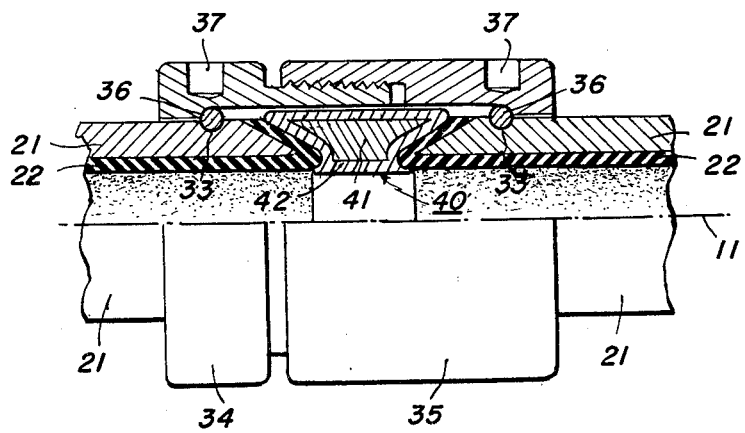
FIG. 6 shows a connection made between two pipes of the kind shown in FIG. 5 made with screw threaded clamping members, the upper half of the figure being in longitudinal section.

As shown in FIG. 6 the free projecting end of the protective lining shown in FIG. 5 is bent back over the conical surface, and the shape of the packing member 40 having a reinforcement 41 and protective layer 42 is suitably modified, as compared with the shape of the packing member 30 in FIGS. 3 and 4, so that its packing surfaces mate with the different direction of inclination of the conical surfaces of the pipes.

Figure 7:
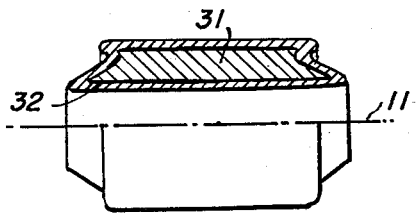
FIG. 7 shows a packing member, the upper half of the figure being in section.

The packing member shown in FIG. 7 is of the same form as that shown in FIGS. 3 and 4 and also has a reinforcement 31 and protective covering 32, but its length in an axial direction is greater. It can serve, for example, to compensate for differences in length caused by inaccurate cutting of the ends of the pipe.

In the drawings there is illustrated only the more important application of the method of the invention, namely for connecting together the ends of two pipes. The situation is of course the same when the connection is made between the end of a long pipe and the end of short fitting such as a T-piece provided with a protective lining. However, by suitably modifying the packing member a tight connection can also be made between the end of a pipe and any other element, for example, a cock, a valve, a manometer etc. which may have, for example, a flat packing surface such as a flange.

In order to form a conical surface as shown at the ends of the pipes in FIGS. 1 and 2 an ordinary lathe may be used. Especially convenient for this purpose are the commercially available transportable tools which carry a cutter that rotates exactly centrally with respect to the firmly clamped pipe and can be moved relatively to the pipe both in an axial direction and a radial direction.

Instead of using rings 36 in the manner referred to in Swiss Patent No. 289,465 which are of circular cross-section, rings of other shapes may be used, for example, of rectangular cross-section, provided that the grooves 33 are suitably shaped to fit the rings.

What is claimed is:

1. A method of making a tight connection between a pipe which is made of hard material and has a protective lining of softer permanently deformable plastic material and another element having a hollow end with the use of a clamping device suitable for pressing the end of the pipe against the other element, which comprises removing by machining a portion of the hard material at the end of the lined pipe from the outer peripheral surface of said protective lining outwardly to form a conical surface while leaving at least a portion of the softer protective lining, expanding and permanently deforming the said portion of the softer protective lining to cover the conical surface while leaving the end of the pipe undeformed, placing a packing member having a surface mating with the covered conical surface and having another surface mating with the surface of the element to which the pipe is to be connected in mating relationship with said covered conical surface, and clamping the assembled parts together.

2. A method of making a tight connection between a pipe which is made of hard metal and has a protective lining of permanently deformable plastic hard rubber and another element having a hollow end with the use of a clamping device siutable for pressing the end of the pipe against the other element, which comprises removing by machining a portion of the hard metal at the end of the lined pipe from the outer peripheral surface of said protective lining outwardly to form a conical surface which tapers inwardly from the end of the pipe while leaving at least most of the hard rubber lining, expanding and permanently deforming the said portion of the hard rubber lining to cover the conical surface while leaving the end of the pipe undeformed, placing a packing member having a surface mating with the covered conical surface and having another surface mating with the surface of the element to which the pipe is to be connected in mating relationship with the covered conical surface, and clamping the assembled parts together.

3. A method of making a tight connection between a pipe which is made of hard metal and has a protective lining of a permanently deformable plastic material substantially softer than hard rubber and another element having a hollow end with the use of a clamping device suitable for pressing the end of the pipe against the other element, which comprises machining away a length of the hard metal extending from the end of the lined pipe back along the pipe to form a conical surface which widens outwardly from the end of the pipe while leaving at least a portion of the softer protective lining, expanding and bending rearwardly and permanently deforming the remaining portion of the protective lining to cover the conical surface while leaving the end of the pipe undeformed, placing a packing member having a surface mating with the covered conical surface and having another surface mating with the surface of the element to which the pipe is to be connected in mating relationship with the covered conical surface and clamping the assembled parts together.

4. A method as claimed in claim 2, wherein a packing member is used of which the mating surface which is to mate with the covered conical surface of the pipe has an annular recess therein for receiving the outer end of the conically shaped portion of the pipe.

5. A method as claimed in claim 2 which comprises connecting two ends of similar pipes which both are of hard metal and have a protective lining of hard rubber.

6. A method as claimed in claim 4 in which the mating surface has a covering of a material having a Shore hardness of about 70 to 90.

7. A method of preparing on pipes of hard material and having a protective lining of softer permanently deformable plastic material flared out tightening surfaces for the connection of the pipes, which comprises the steps of removing the material of the ends of the pipes from the lining outwardly for forming at the pipe end within the hard material of the pipes a flared out conical surface without removing the lining, and expanding and permanently deforming the softer protective lining left within said flared out conical surface to cover said surface, whereby a packing member having a surface mating with the covered conical surface and having another surface mating with a surface of the element to which the pipe is to be connected can be placed in mating relationship with said covered conical surface, and the assembled parts can be clamped together.

References Cited in the file of this patent

UNITED STATES PATENTS

| | | |
|---|---|---|
| 1,058,542 | Brown | Apr. 8, 1913 |
| 1,876,455 | Inshaw | Sept. 6, 1932 |
| 2,061,269 | Coakley | Nov. 17, 1936 |
| 2,070,852 | Bannerman | Feb. 16, 1937 |
| 2,216,033 | Hopkins | Sept. 24, 1940 |
| 2,218,835 | Ulrich | Oct. 22, 1940 |
| 2,248,969 | Darling | July 15, 1941 |
| 2,574,714 | Smith | Nov. 13, 1951 |
| 2,656,594 | Westling | Oct. 27, 1953 |
| 2,900,200 | Umstadter | Aug. 18, 1959 |

FOREIGN PATENTS

| | | |
|---|---|---|
| 883,048 | France | June 22, 1943 |
| 708,224 | Germany | June 5, 1941 |